(12) United States Patent
Burgess et al.

(10) Patent No.: US 12,259,904 B1
(45) Date of Patent: Mar. 25, 2025

(54) REDUCTION COMPONENT CONVERSION AND ASSIGNMENT

(71) Applicant: Neptune Flood Incorporated, St. Petersburg, FL (US)

(72) Inventors: Trevor Burgess, St. Petersburg, FL (US); James Dennis Albert, St. Petersburg, FL (US); Brad Henry Schulz, Odessa, FL (US); James Edward Steiner, St. Petersburg, FL (US); Michael Freed Dezube, Wellesley, MA (US); William Guy Beakley, Carlisle, MA (US); Matthew Paul Duffy, St. Petersburg, FL (US)

(73) Assignee: Neptune Flood Incorporated, St. Petersburg, FL (US)

( * ) Notice: Subject to any disclaimer, the term of this patent is extended or adjusted under 35 U.S.C. 154(b) by 0 days.

(21) Appl. No.: 18/534,903

(22) Filed: Dec. 11, 2023

(51) Int. Cl.
*G06F 16/00* (2019.01)
*G06F 16/22* (2019.01)
*G06F 16/25* (2019.01)
*G06F 16/27* (2019.01)

(52) U.S. Cl.
CPC ........ *G06F 16/258* (2019.01); *G06F 16/2246* (2019.01); *G06F 16/27* (2019.01)

(58) Field of Classification Search
None
See application file for complete search history.

(56) References Cited

U.S. PATENT DOCUMENTS

| | | |
|---|---|---|
| 7,107,285 B2 | 9/2006 | Von Kaenel et al. |
| 7,315,842 B1 | 1/2008 | Wang |
| 8,330,756 B2 | 12/2012 | Araki et al. |
| 8,676,613 B2 | 3/2014 | Stewart et al. |
| 8,738,408 B2 | 5/2014 | Stewart et al. |
| 9,558,520 B2 | 1/2017 | Peak et al. |
| 10,572,947 B1 | 2/2020 | Berends et al. |
| 2006/0100912 A1 | 5/2006 | Kumar et al. |
| 2007/0233527 A1 | 10/2007 | Dillard |
| 2010/0070309 A1 | 3/2010 | Deede et al. |

(Continued)

FOREIGN PATENT DOCUMENTS

WO 2021091954 A1 5/2021

OTHER PUBLICATIONS

International Search Report and Written Opinion for PCT/US2020/58799; Feb. 3, 2021; 10 pgs.

*Primary Examiner* — Anhtai V Tran
(74) *Attorney, Agent, or Firm* — Shumaker, Loop & Kendrick, LLP; Jeffrey B. Fabian

(57) ABSTRACT

A system for electronically automating reduction component selection, conversion, disaggregation, and assignment is provided. The system generates graphical user interfaces that accept data relating to a reduction component to be analyzed and assigned to a qualified facility. The system identifies a segment associated with each reduction component and identifies all reduction components within a segment. A reduction concentration is determined in near real time for each segment by totaling the concentrations for each reduction component within a segment. The reduction concentration is compared to an Available Reduction Threshold to determine if facility capacity has been exceeded for new reduction components and for previously assigned reduction components.

20 Claims, 9 Drawing Sheets

(56) References Cited

U.S. PATENT DOCUMENTS

| | | | |
|---|---|---|---|
| 2011/0317154 A1 | 12/2011 | Tan et al. | |
| 2013/0211861 A1* | 8/2013 | Stewart | G06Q 40/08 705/4 |
| 2017/0339636 A1* | 11/2017 | Buck | H04W 72/53 |
| 2022/0374994 A1* | 11/2022 | Burgess | G06Q 40/08 |

* cited by examiner

REDUCTION COMPONENT CONVERSION AND ASSIGNMENT

TECHNICAL FIELD AND BACKGROUND

The present invention relates generally to systems and methods for evaluating and assigning possible reductions, and more particularly, to systems and methods that enable the real-time, automated processing of reduction selection, conversion, disaggregation, and assignment to appropriate facilities.

Traditional systems and methods for evaluating reduction rely primarily on manual user inputs, oral interviews, in-person inspections, or at best a limited number publicly accessible, outdated databases to select and rate the risk of loss associated with a reduction component. As a result, traditional methods for evaluating reduction components are time-consuming, labor-intensive, and inefficient. These inefficiencies coupled with limitations on the accuracy of the input data in turn limit the complexity, accuracy, and comprehensiveness of the reduction components evaluation.

After a reduction is evaluated, the reduction must be assigned to an appropriate facility based in part on the facility's concentration of existing reduction components with similar characteristics and the facility's capacity to compensate for losses resulting from a realized reduction. Managing the concentration of reduction components, a process referred to as "disaggregation," is itself a challenging and time-consuming task that must be performed on a regular basis to ensure that reduction components are not assigned to a facility that has exceeded limitations on reduction concentration.

As a consequence of the inefficiencies in the reduction evaluation and disaggregation processes, by the time a reduction component evaluation is complete and approval for assignment is received, it is not uncommon for a facility's reduction profile to change such that the facility can no longer accept the reduction component. It would, therefore, be advantageous to provide systems and methods that enable the real time evaluation of reduction components and assignment to a suitable facility.

The present invention fulfills the foregoing need by providing systems and methods, that enable the real-time evaluation and assignment of reduction components. The system relies on a streamlined amount of initial data input concerning a reduction component to perform a seamless, real-time, automated gathering of additional reduction component data that is in turn used to generated targeted inquires to a user and to evaluate the relative probability a reduction will be realized and the potential degree of loss as well as other characteristics concerning the reduction components. The system evaluates reduction components according to customizable categories, such as geographic regions or sector so that reduction concentration and capacity can be managed effectively, efficiently, and in real time.

SUMMARY

The system includes computer-readable code implements Conversion Display System interface software that is configured to generate one or more graphical user interfaces that are output to a display screen of an end user computing device, such as a laptop or smartphone. Each graphical user interface includes one or more reduction component data input elements. The reduction component data input elements can be, for instance, a text box or pull down menu associated with a narrative or image inviting the end user to input certain information to the graphical user interface. The entered information can be reduction component data relating to a potential reduction component to be assigned to a facility. The Conversion Display System interface software receives initial reduction component data that is input to the reduction component data input element and passes it to a Triton software engine.

The computer-readable code implements the Triton software engine, which is configured to perform operations that include passing reduction component data to a application programming interface ("API") that accesses a supplemental reduction component database to retrieve supplemental reduction component data. The system can utilize a wide variety of supplemental reduction component data APIs to interface with various databases, software systems, or platforms to retrieve and access data and information relevant to analyzing a reduction component. Typically, the Triton software engine passes reduction component data to the supplemental reduction component data API and in turn receives the supplemental reduction component data. To illustrate, the Triton software engine can interface with a Mapping API by passing reduction component location data, such as a mailing address, to the Mapping API and in return receiving one or more sets of geographic coordinates (e.g., Global Positioning System ("GPS") coordinates) that correspond to the reduction component location. In another example, the Triton software engine can pass either the reduction component location data in the form of a mailing address or the supplemental reduction component data in the form of GPS coordinates to an Elevation API and in return receive elevation data that describes the elevation above sea level of real property that defines the reduction component.

As part of analyzing the reduction component, the Triton software engine performs a Reduction Selection Analysis to determine whether one or more of a given set of facilities can accept assignment of the reduction component. When it is determined that a facility can accept assignment of a reduction component, the facility identification is added to a list of qualified facilities that can be stored to a database. The Reduction Selection Analysis includes the operations of retrieving the facility identifications and facility reduction selection rules from a data storage device. Then, for the facility identifications, the Triton software engine applies the associated facility reduction selection rules to the reduction component data to determine a list of qualified facility identifications.

The Triton software engine also performs a Conversion Analysis utilizing the reduction component data to generate a reduction component conversion (e.g., an acceptable premium amount) and a reduction component value (e.g., the potential liability presented if a loss is realized).

The Triton software engine also performs a Disaggregation Analysis to determine whether a facility can accept a particular reduction component within a given geographic area, industry, market, or other category, as explained more fully below. The Disaggregation Analysis includes the operation of defining a segment (e.g., a geographic area or radial) comprising a plurality of assigned reduction components and the operation of retrieving or determining one or more reduction metrics for each assigned reduction component within the segment. The processor determines a reduction concentration by totaling the reduction metric values within the segment. The system compares the reduction concentration against the available reduction threshold for the facility and removes the qualified facility identification from the list of qualified facility identifications when the reduction concentration exceeds the available reduction threshold.

The Triton software engine is also configured to perform a Capacity Analysis to determine whether a facility has the resources to cover potential liabilities if the facility accepts assignment of the particular reduction component. The Capacity Analysis considers the reduction values for the reductions already assigned to a facility as well as the reduction value for the reduction component being evaluated for possible assignment. The system compares the total reduction value for a qualified facility identification against the available capacity threshold for each qualified facility identification and removes the qualified facility identification from the list of qualified facility identifications when reduction concentration exceeds the available capacity threshold.

Finally, to assign a reduction component to a particular facility, the Triton software engine uses a Facility Assignment Process to balance the reduction assignments and assure that no single facility is assigned too many reduction components. The Facility Assignment Process utilizes liner weight calculation techniques to determine a target number of reduction components that each facility should be assigned, which is compared to the number of reduction components actually assigned. The system ascertains the difference between the target number of reduction component assignments for a facility identification and the actual number of reduction assignments received for a facility identification. The difference is the assigned reduction distance value, and the Triton software engine can be configured to assign reduction components to the facility with the lowest assigned reduction distance value to ensure the assignments remain balanced. As reduction components are assigned, weights assigned to each facility can be recalculated to continuously ensure balanced assignment.

In one example embodiment, a system for electronically automating reduction component conversion and assignment comprises a computer that includes at least one processor and a memory device that stores data and executable code that, when executed, causes the at least one processor to capture assigned reduction component data from a reduction dampening instrument database. The processor populates an intermediate database table using the assigned reduction component data. The intermediate database table is spatially indexed according to hierarchical uniform two-dimensional data trees that each have an index value, and the intermediate database comprises a plurality of entries that are each associated with an assigned reduction component, an assigned reduction metric (e.g., a total insured value or average annual loss), location data, and one of the index values. The processor generates for each assigned reduction component, an assigned reduction concentration according to a defined segment.

The processor receives a new "first" reduction component for assignment. The reduction component includes at least location data and an first reduction component metric. The processor assigns the first reduction component one of the index values based on the location data and places the first reduction component within the defined segment of one of the assigned reduction components using the index values and the location data. The processor then updates the assigned reduction concentration according to the defined segment using the first reduction component metric. The processor then compares the updated assigned reduction concentration to an Available Reduction Threshold. If the updated assigned reduction concentration exceeds the Available Reduction Threshold, the processor (i) assigns the first reduction component to a different facility with suitable capacity, or (ii) marks the reduction component for non-assignment. When a reduction component is marked for non-assignment, the applicable policy can be immediately cancelled or marked for cancellation at the time of renewal such that renewal is not permitted, as discussed in more detail below.

In one aspect of the system, the defined segment is a radial, which can be a five-mile radial or a twenty-mile radial. The reduction metric can be a total coverage amount or an average annual reduction. The two-dimensional data trees can quad-trees such that the reduction components are indexed into to one of four pre-defined, two-dimensional areas corresponding to a geographic location of the reduction component. Using the spatially indexed postgress intermediate database, the processor can generate, for each assigned reduction component, the assigned reduction concentration at least once per hour. In other words, the reduction concentration for every segment in the system is recalculated every hour.

In addition to analyzing updated reduction concentrations for reduction components that have already been assigned, the system can analyze reduction concentrations for "new" reduction components. This process is used to determine if there is a qualified facility with capacity to take the reduction component. In this case, the processor define a first segment for the first reduction component. The processor then locates proximal assigned reduction components using the index values. Put another way, the processor detects assigned reduction components that are proximal to the new reduction component being evaluated for possible assignment.

The processor then determines which of the assigned reduction components are within the first segment. That is, the processor uses the location data to place proximal assigned reduction components into the first segment. The processor then generates a first reduction concentration over the first segment using the assigned reduction metrics and the first reduction metric. To accomplish this function, the processor calculates the total value of the reduction metrics for each of the assigned reduction metrics within the first segment with the reduction metric for the "new" reduction component being evaluated. Finally, the processor compares the first reduction concentration to the Available Reduction Threshold. If the first reduction concentration exceeds the Available Reduction Threshold, the processor (i) caches the first reduction component, (ii) assigns the first reduction component to a different facility, or (iii) marks the first reduction component for non-assignment.

In another embodiment, a system for electronically automating reduction component conversion and assignment comprises a computer that includes at least one processor and a memory device that stores data and executable code that, when executed, causes the at least one processor to instruct a radial directed acyclic graph to synchronize a reduction dampening instrument database with an intermediate database. The synchronization is accomplished by capturing a subset of the data from the reduction dampening instrument database and using the subset to create the intermediate database. The reduction dampening instrument database can be a database of insurance policies covering the reduction components. The reduction dampening instrument database includes a wide variety of data relating to the reduction components.

The intermediate database is spatially indexed according to hierarchical uniform two-dimensional data trees that each have an index value. The intermediate database is made up of a plurality of entries that are each associated with an assigned reduction component, a first reduction metric, location data, and one of the index values.

The processor defines a first segment for each assigned reduction component and then locates, for each assigned reduction component, one or more proximal reduction components using the index values. The processor uses the location data to identify one or more proximal reduction components within the first segment. In short, the index values are used to determine which of the numerous assigned reduction components are proximal to the assigned reduction component. Of those proximal reduction components, the processor uses the location data to identify the proximal reduction components that are actually within the first segment.

The processor generates, for each assigned reduction component, a first reduction concentration for the first segment by aggregating both (i) the first reduction metric for each proximal reduction component within the first segment and (ii) the first reduction metric for the assigned reduction component. The processor then compares the first reduction concentration for the first segment to an Available Reduction Threshold. If the first reduction concentration for the first segment exceeds the Available Reduction Threshold, the processor (i) reassigns the assigned reduction component to a different facility, or (ii) marks the assigned reduction component for non-assignment.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
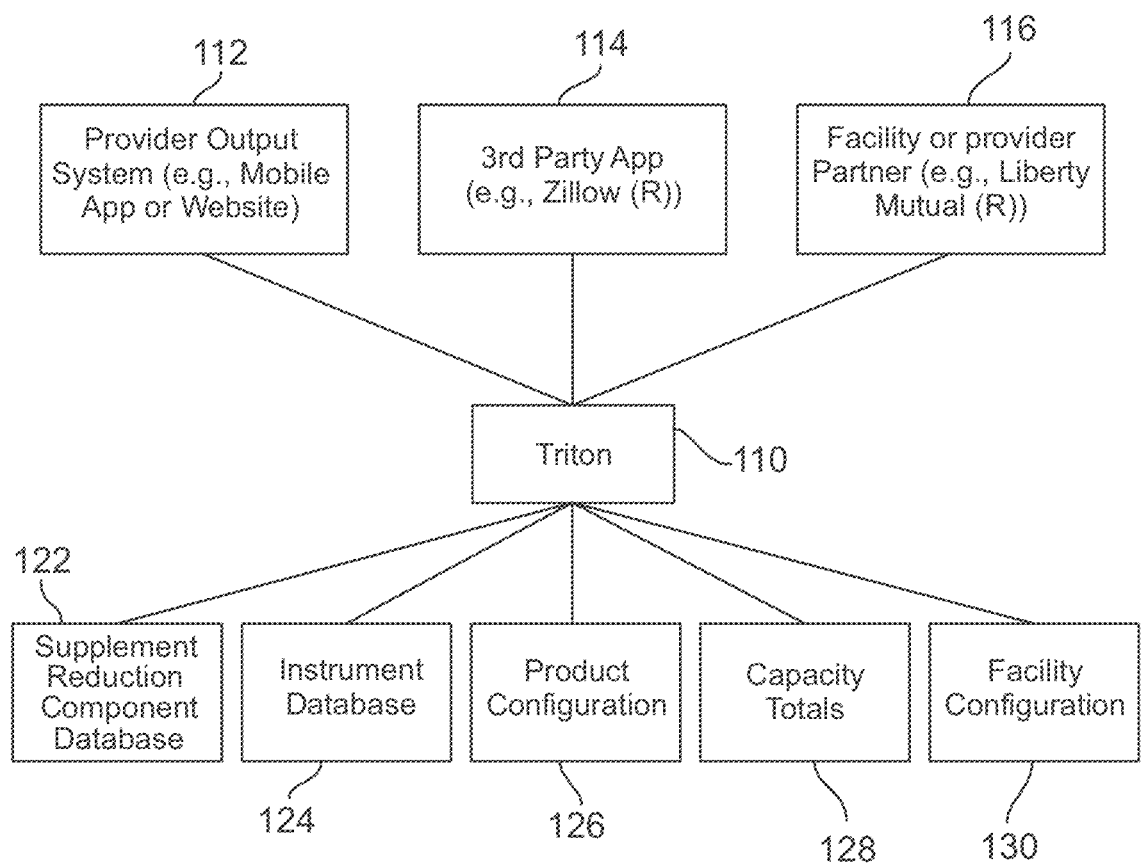
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

Disclosed are systems and methods that enable the real-time, automated processing of reduction selection, conversion, disaggregation, and Facility Assignment. The example embodiments disclosed herein are described with reference to evaluating and processing reduction associated with establishing flood insurance policies. However, those of ordinary skill in the art will appreciate that the disclosed systems and methods could be applicable to evaluating and processing other types of reductions in other industries and contexts.

As used herein, the term "provider" generally describes an entity that evaluates and assigns a given reduction utilizing the inventive systems and methods disclosed herein. The term "facility" is used interchangeably with the terms "capacity provider," "binding authority," or "insurer" and refers to an entity that undertakes to be responsible for a given risk of loss or casualty to a subject person or property in exchange for payment, such as a premium or deductible. The term "reduction" generally refers to a realized or potential loss or casualty resulting from damage or harm to persons, real property, or personal property. The term "reduction absorption" refers to the amount of loss or reduction that a facility will pay for and can be used interchangeably with the terms "coverage amount" or "insured value."

The term "reduction dampening instrument" refers to an insurance policy having a particular coverage amount that can be paid in the event of a reduction to a subject person or property. The term "reduction component" denotes the person or property that is to be secured against a loss through an insurance policy and can include, for example, personal property, real property (including a dwelling or structure located on such real property), or a person whose health or life is to be insured. The terms "user" or "policy holder" generally denote an individual that is associated with the reduction component and that seeks to secure the reduction component against a loss using the present systems and methods.

System Overview

In one embodiment, a system for electronically automating reduction components selection, conversion, disaggregation, and assignment includes at least one provider server processor that is coupled to at least one data storage device. The data storage device is a non-transitory computer-readable medium having integrated computer-readable code for instructing the at least one provider server processor. The data storage device also includes at least one database for storing one or more facility identifications. The facilities can be enterprises configured to accept reduction components, such as insurers, and the facility identifications provide a mechanism for the systems described herein to identify and track the facilities.

Within the database, the facility identifications are each associated with one or more assigned reduction dampening instruments, which can be insurance policies covering reduction components such as properties or casualties presenting a potential liability or risk of loss. The assigned reductions are each in turn associated within the relational database with an assigned reduction value (e.g., the amount a facility will be liable for if a loss is realized), an assigned reduction location data (e.g., address of an insured property) as well as facility reduction selection rules that can determine the conditions pursuant to which a facility will accept a reduction presented by a reduction component. Facility selection rules can include, for instance, rules declining to accept a reduction component within a particular geographic area, or in the context of flood insurance, rules declining to accept a reduction component that is a property below a given elevation. The database also associates the facility identifications with data and information such as an available reduction threshold and an available capacity threshold.

The systems and methods disclosed herein provide a graphical user interface ("GUIs") that accepts streamlined initial reduction component data inputs from a user. The initial reduction component data is transmitted to a Triton software engine that utilizes the initial reduction component data to gather supplemental reduction component data from one or more supplemental databases. The supplemental databases can be local or remote to the Triton software engine and hosted or maintained by a third-party data provider. The initial or supplemental reduction component data can be used to generate targeted, customizable queries called reduction component data input elements that are presented to the user to seek targeted reduction component data useful for evaluating a reduction component.

The initial, supplemental, and/or targeted reduction component data are used to perform a Reduction Selection Analysis and a Reduction Conversion Analysis. The Reduction Selection Analysis evaluates whether a particular reduction component meets underlying qualifications of a reduction dampening instrument product (i.e., an insurance policy product) provided by a facility. As a simplified example, if the Reduction Selection Analysis shows that a particular property (i.e., a reduction component) is located five (5) feet below sea level, then the reduction component would not fit the criteria of reduction dampening instrument that covers only flood losses for properties above sea level. The Reduction Conversion Analysis evaluates the degree of a particular reduction and can be translated to, for instance, an insurance premium payment amount. The Reduction Selection and Reduction Conversion analyses rely on a combination of rule-based and quantitative modeling steps.

Following the Reduction Selection and Reduction Conversion Analysis, the system performs a Disaggregation Analysis that considers a facility's concentration of reductions of a certain type or that share common characteristics, such as reductions within a given geographic area or market sector. As part of the Disaggregation Analysis, the system additionally conducts a Capacity Analysis that examines a facility's capacity or ability to adequately compensate for losses resulting from a covered reduction. Both reduction concentration management and capacity management are critical to ensuring continued successful operation of a facility and to protecting against extensive reductions that would otherwise entirely consume a facility's resources and undermine the facility's ability to compensate for additional losses from realized reduction.

The result of the Reduction Section, Reduction Conversion, Disaggregation, and Capacity analyses is to identify suitable facilities for assignment of a reduction. The suitable facilities are stored to a database as a list of "qualified facilities" that are identified with a facility identification. Reduction components are assigned based on a Facility Assignment Process that utilizes weighted, round-robin techniques to distribute reductions to suitable facilities based on available capacity or other relevant factors. Details of the inventive system and methods as well as the particular analyses are discussed in more detail below.

Turing to FIG. 1, an example system configuration according to one embodiment includes: (i) a Triton software engine 110; (ii) one or more graphical user interfaces generated by Conversion Display System interface software where the graphical user interfaces are associated with, for example, a provider website or mobile software application 112, a third-party software application 114, or a facility partner 116; (iii) a supplemental reduction component database 122; (iv) a reduction dampening instrument database 124; (v) a product configuration database 126; (vi) a capacity database 128; and (vii) a facility configuration database 130.

The system embodiment shown in FIG. 1 is not intended to be limiting, and those of ordinary skill in the art will recognize that the systems and methods of the present invention may be implemented using other suitable hardware or software configurations. For example, the supplemental reduction component database 122, reduction dampening instrument database 124, product configuration database 126, capacity database 128, and/or facility configuration database 130 can be implemented as a single relational database residing on a data storage device that includes a non-transitory computer-readable medium. Alternatively, the system may utilize multiple supplemental reduction component databases 122, only a single user interface (112, 114, or 116), or the single Triton software engine 110 shown in FIG. 1 can be implemented by two or more separate software modules running on one or more computing devices.

The various system components are generally implemented by software applications running on one or more physical or virtual computing devices. To illustrate, in one embodiment, the provider Conversion Display System interface software 112 is implemented as a mobile software application running on a mobile computing device that is in electronic communication with a separate provider server running the Triton software engine 110. Alternatively, the Conversion Display System interface software 112 can be implemented as a website hosted on a virtual web server that is in turn running on the same physical computing device as the Triton software engine 110.

The computing devices may also utilize software applications that function using resource available through a third-party provider, such as a Software as a Service ("SaaS"), Platform as a Service ("PaaS"), or Infrastructure as a Service ("IaaS") provider running on a third-party cloud service computing device. For example, a cloud computing device may function as a policy database 124 by providing remote data storage capabilities.

Users access the user interfaces (112, 114, or 116) through a personal computing device, such as a desktop computer, laptop computer, a cellular smart phone, or tablet computing device. The personal computing device that includes an integrated software application configured to operate as a user interface and to provide two-way communication with the provider's computer system running the Triton software engine 110. The integrated software application interfaces with a communication subsystem to provide for a secure connection with other electronic devices. The various computing devices and software applications communicate using a variety possible connections that can include, for example, a local area network, a wide area network, an intranet, an Internet connection, a mobile telephone network, or any other suitable connection.

The provider maintains a reduction dampening instrument database 124 that includes a table with data fields related to reduction dampening instruments that have been assigned to a facility. The reduction dampening instrument database 124 includes individuals entries, or rows, for each reduction dampening instrument stored to the database. Each reduction dampening instrument is associated with one or more reduction components, such as a real property.

Data stored to the dampening instrument database 124 includes, without limitation: (i) a unique identification for each reduction dampening instrument stored to the database; (ii) the inception dates of reduction dampening instruments; (iii) geographic coordinates of reduction components (e.g., a property location); (iv) the name or identification of a natural person or entity that is the owner of the reduction component or the reduction dampening instrument; (v) a facility identification; (vi) gross premium amounts; (vii) flood average annual reductions ("AAR"); (viii) surge AAR caused by surges in ocean tides; (ix) reduction dampening instrument status (i.e., whether an insurance policy is active or inactive); (x) a total coverage amount ("TCA") that can be transferred to the owner or holder of a reduction dampening instrument in the event of a loss or casualty; (xi) a reduction component assignment type (i.e., a newly assigned reduction component or a renewal); (xii) a reduction component postal address; and (xiii) contact information for the owner of a reduction component or a reduction dampening instrument.

In another embodiment, the system for electronically automating reduction selection, conversion, disaggregation, and assignment includes at least one provider server processor coupled to at least one data storage device. The data storage device comprises a non-transitory computer-readable medium with computer-readable code for instructing the provider server processors. The data storage device also includes at least one database that stores one or more facility identifications. The facility identifications stored to the database can each be associated with: (i) one or more assigned reductions that are each in turn associated with an assigned reduction value and assigned reduction location data; (ii) facility reduction selection rules; (iii) an available reduction threshold; and (iv) an available capacity threshold.

Conversation Output, Reduction Selection, and Conversion

A Conversion Display System software interface generates graphical user interfaces that solicit and accept input concerning the reduction components in the form of reduction component data that is used to analyze reduction components. The Conversion Display System software interface can be configured to seek input in a sequential fashion that tailors the input solicited based on prior answers so that appropriate follow up information is received. This feature is implemented such that after receiving the initial reduction component data that is input to the first reduction component data input element of the first graphical user interface, the Conversion Display System interface software generates a second graphical user interface that is output to the display screen of the end user computing device. The second graphical user interface includes a second reduction component data input element as an integrated part of the second graphical user interface. The Conversion Display System interface software includes logic that selects the content of the second reduction component data input element based on the initial reduction component data that is input into the first reduction component data input element.

The Conversion Display System interface software logic can be illustrated by a simplified example where real property is evaluated as the reduction component. The first reduction component data input element prompts an end user to enter reduction component data by selecting a type of home represented by the reduction component. The options for the type of home can include a single-family house, a multi-story complex, and a manufactured home. If the option for a single-family house is selected, the Conversion Display System interface software logic generates a second graphical user interface with a second reduction component data input element that solicits relevant follow up reduction component data, such as asking the user to further specify the type of structure for the single-family house. In that case, the second reduction component data input element can prompt the entry of reduction component data selected from options that include a home on a slab, a home on a crawl space, a home with a basement, and a home on stilts or pilings. Had the type of home been specified as a multi-story complex or a manufactured home, then the Conversion Display System interface software logic would have presented different options for the second reduction component data input element.

In another aspect of the system, the second reduction component data input element can be implemented as an interactive map, and the reduction component data is input by graphically selecting a geographic location on the interactive map using the end user computing device. For example, the location of a structure on a real property is input by an end user computing device by selecting a location on the interactive map. The Triton software engine then determines the structure elevation by correlating the structure location data to at least one geographic coordinate pair and the correlated elevation data value. Put another way, the elevation is determined at the point (or points) on a property where a structure is located, as indicated by a graphical selection on the interactive map.

Figure 2:
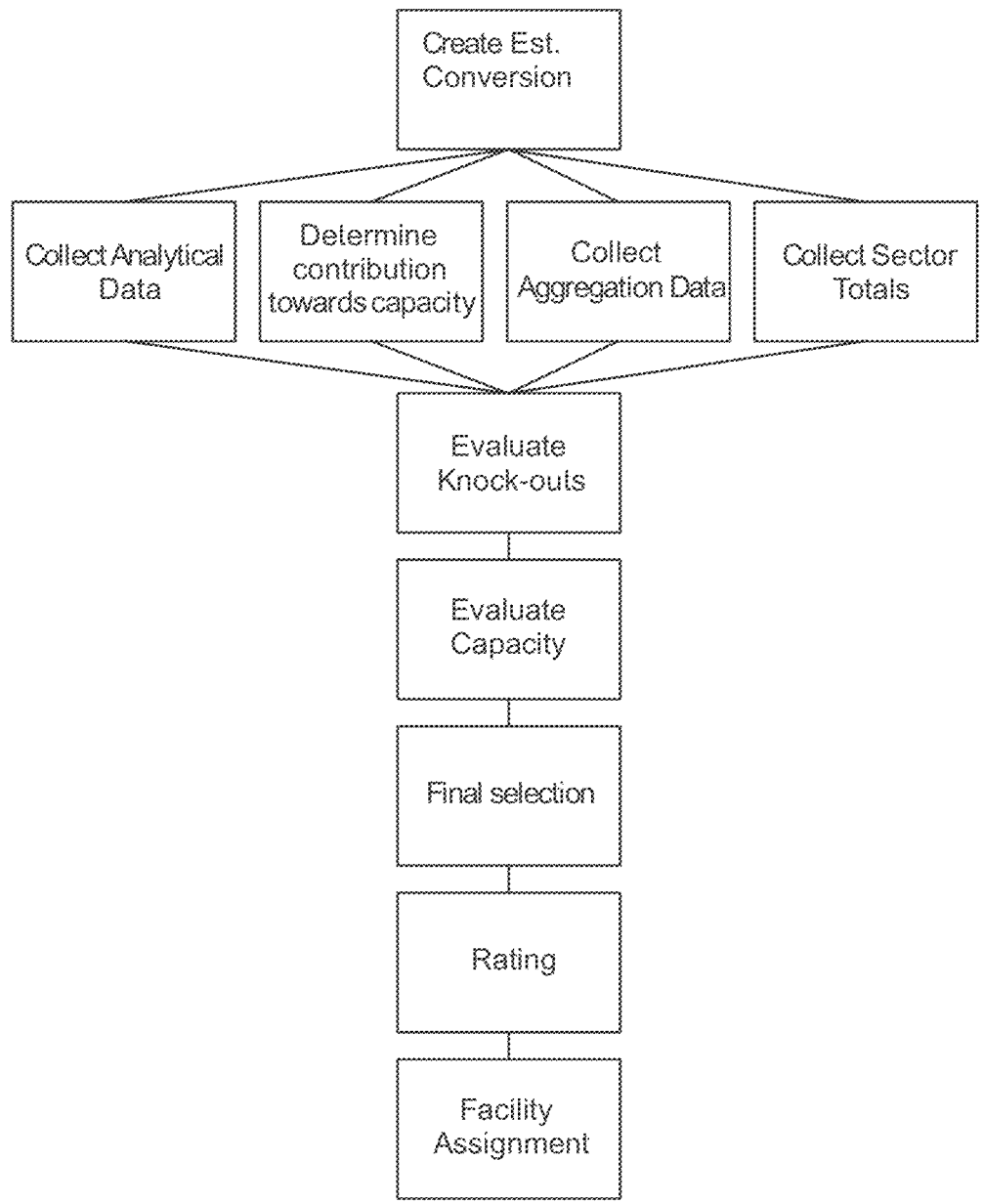
FIG. 2 is an example process according to one embodiment.
Figure 3:
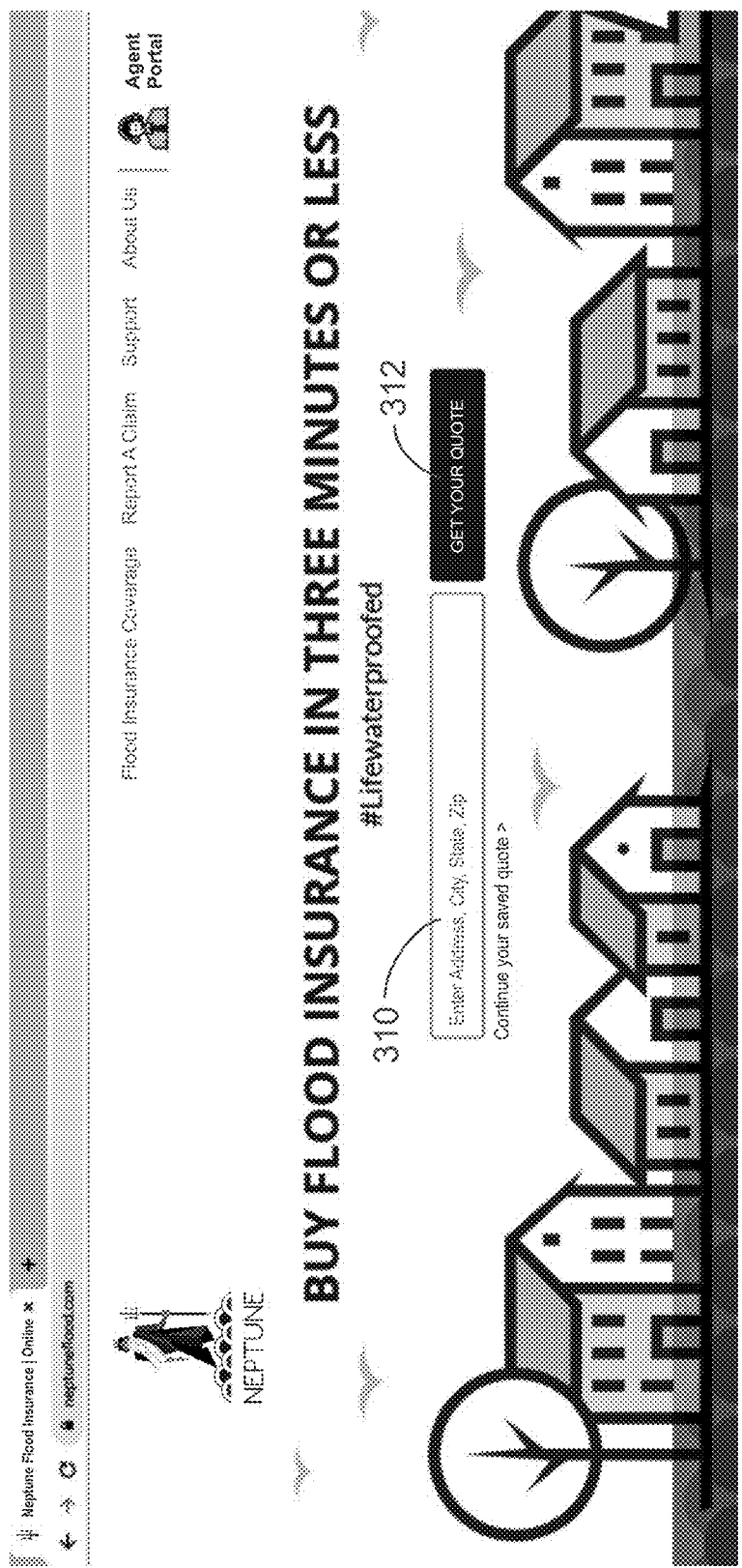
FIG. 3 illustrates an example graphical user interface according to one embodiment.

Turning to the process flow shown in FIG. 2, the Reduction Selection and Conversion Analyses begin when a user initiates the Create Conditional Conversion value step through a graphical user interface (112, 114, or 116) generated by the Conversion Display System interface software. An example provider graphical user interface for purchasing flood insurance is shown in FIG. 3 where the reduction component is real property and the reduction to be secured against is the risk of loss due to flooding. The user is prompted to enter reduction component data, such as a mailing address for real property. The user enters the mailing address into the reduction component data input element 310, which is implemented as a text box with accompanying text. The user then selects the Get Your Conditional Conversion value 312 function to continue the process and transmit the reduction component data to the Triton software engine 110.

Figure 4:
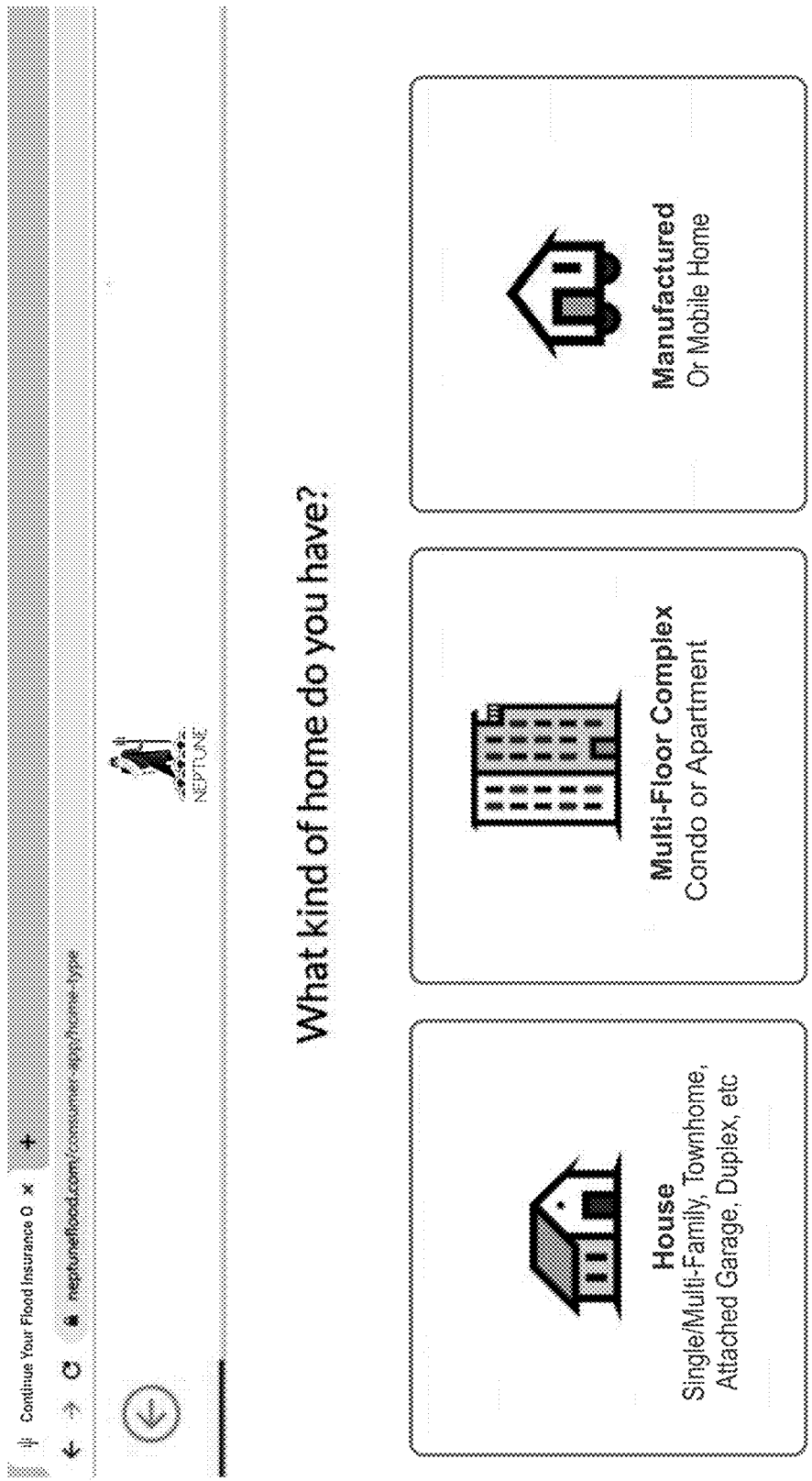
FIG. 4 illustrates an example graphical user interface according to one embodiment.

In addition to address information, the system can optionally request other types of reduction component data from the user either before or after the initial entry (i.e., the mailing address) is transmitted to the Triton software engine 110. Continuing with the example embodiment for assigning flood risk to a facility providing flood insurance, the user can be presented with a graphical user interface, such as the interface shown in FIG. 4, asking the user to specify the type of structure on the real property that is to be secured against a loss, such as whether the structure is a single family home, a multi-floor complex, or a manufactured structure.

Figure 5:
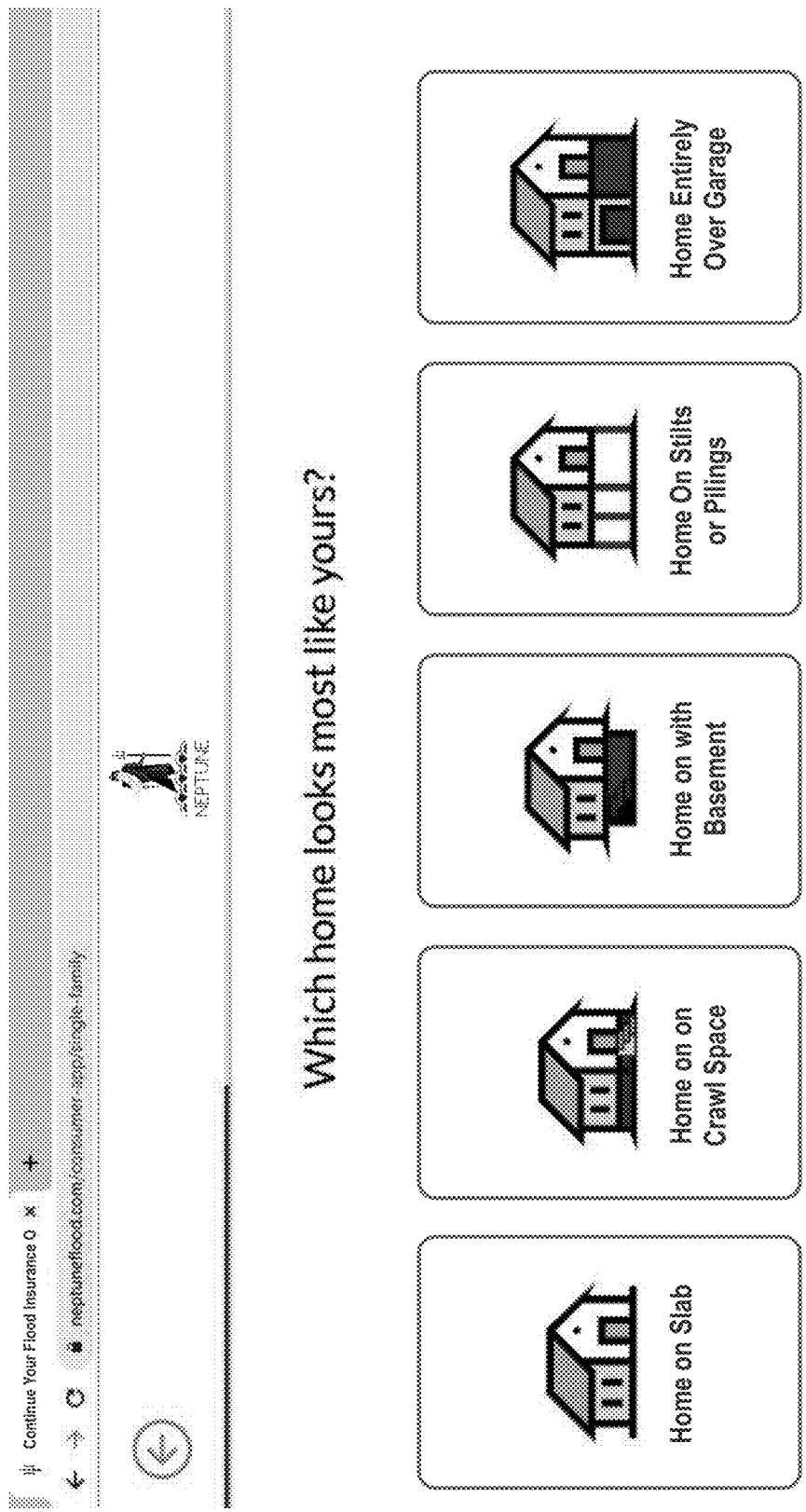
FIG. 5 illustrates an example graphical user interface according to one embodiment.
Figure 6:
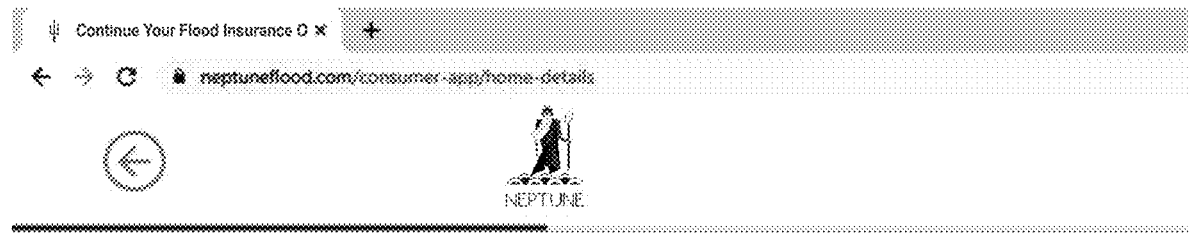
FIG. 6 illustrates an example graphical user interface according to one embodiment.

The Conversion Display System interface software 112 can include logic that presents users with GUIs and reduction component data input elements that are generated based on a user's prior reduction component data inputs. That is depending on the user's response to the initial queries, the user may be asked to provide more granular, second-level data and information. For instance, as depicted in FIG. 5, if the user indicates that the real property includes a single-family home, the system can present the user with an interface that further asks whether the structure: (i) is situated on a concrete slab; (ii) sits above a crawl space, basement, or garage; or (iii) is elevated on stilts or pilings. As another example, if the user indicates that the structure is a multi-floor complex, the system may present the user with an interface that asks whether the reduction component includes a dwelling or structure that is: (i) on the ground level; (ii) located above a garage; or (iii) located on the second floor (or higher) of a multi-complex structure.

Turning again to the process flow shown in FIG. 2, after the Triton software engine 110 receives one or more categories of reduction component data, the Triton software engine 110 initiates the Collect Analytical Data step by communicating with a one or more supplemental reduction component databases 122, among other sources, to gather supplemental reduction component data. The initial reduction component data and supplemental reduction component data can in turn be used by the Conversion Display System interface software 112 logic to create targeted inquiries to the user for further relevant information and/or to begin conducting the Reduction Selection, Reduction Conversion, and Disaggregation analyses. Once the initial reduction component data, supplemental reduction component data, and/or targeted reduction component data is gathered, the various received data can be stored to a data storage device as part of a reduction component database record representing a reduction component.

The automated gathering of supplemental reduction component data and generation of targeted inquiries has the advantage of making the reduction component assessment process substantially more efficient compared to conventional methods in part by allowing a user to initiate the assessment process through providing a streamlined amount of initial reduction component data. To illustrate, the embodiment depicted in FIGS. 3 through 6 permits a user to initiate the process of assessing and placing a flood risk by entering only an address and a few details about structures on the real property that are likely known or readily ascertainable by the user. The system presents the user with targeted follow up inquiries that are more likely to be directly relevant to assessing the reduction in a given case so that, for instance, a user seeking to assign reduction associated with a single family dwelling is not asked questions that are relevant only to a multi-floor apartment complex.

Moreover, the system also allows a provider to gather detailed reduction component data from a wide variety of databases to improve the accuracy of the reduction assessment. Once a streamlined amount of reduction component data is gathered from the user, the system seamlessly gathers detailed supplemental reduction component data and performs the Reduction Selection Analysis, Reduction Conversion Analysis, and Facility Assignment Processes in real time.

In an example embodiment that evaluates flood risk, gathering supplemental reduction component data can include gathering ground elevation and geolocation data from an external supplemental reduction component database 122. In that case, the Triton software engine 110 relies on various APIs, such as a Mapping API, to communicate with a reduction component database 122 that includes data correlating mailing address information to ground elevation information and to latitude and longitude geographic coordinates. The Triton software engine 110 passes the address information received from the user computing device to the Mapping API and in turn receives ground elevation and geolocation data associated with the mailing address.

The Triton software engine can also pass the reduction component geolocation data to an Elevation API. The Elevation API interfaces with an elevation database by utilizing the reduction component geolocation coordinate data to obtain reduction component elevation data corresponding to the reduction component geolocation coordinate data. The Elevation API returns the reduction component elevation data to the Triton software engine.

In some cases, it is advantageous to determine the elevation at multiple points on real property that constitutes a reduction component. This provides a more accurate insight into the characteristics of the reduction component, including the elevation at a point where structures on the property might be located. In such embodiments, the reduction component geolocation coordinate data returned from the Mapping API includes a plurality of geographic coordinate pairs representing points on a map. The Triton software engine can pass either one or both of the reduction component location data or the reduction component geolocation coordinate data to a Property API.

The Property API interfaces with a property database by utilizing the reduction component location data or the reduction component geolocation coordinate data to obtain reduction component structure location data (e.g., the location of any structures on the reduction component real property). The Triton software engine then determines a reduction component structure elevation by correlating the reduction component structure location data to at least one geographic coordinate pair and the correlated elevation data value. Put another way, the elevation is determined at the point (or points) on a property where a structure is located.

The triton software engine 110 can utilize similar techniques to gather information from other supplemental reduction component databases 122 maintained by the provider or by third parties. With regard to evaluating reduction associated with flooding, the Triton software engine 110 may gather supplemental reduction component data relating to the real property at issue as well as data relating to the probability that the real property will be flooded and the potential water levels experienced during a flood. Relevant real property information could include: (i) precise orientation and location information for structures located on the real property; (ii) the year structures on the real property were built; (iii) the type of construction for the structures (e.g., wood frame, concrete block, etc.); or (iv) any other data relevant to conducting a Reduction Selection and Reduction Conversion Analysis. Relevant data relating to flooding statistics could include, but is not limited to: (i) whether the real property is located in an area designed as a 10-year, 20-year, or 100-year, etc. flood zone (i.e., 10%, 5% or 1% reduction of flooding each year); and (ii) the expected water levels during a flood event (known as the "base flood elevation").

The gathered supplemental reduction component data can be utilized to initiate the Reduction Selection Analysis as well as to create additional targeted inquiries to the user to gather additional targeted reduction component data. With regard to additional targeted inquiries, supplemental reduction component data may indicate, for example, that the year of construction or the precise location of structures on the real property could not be ascertained. In that case, the system could optionally request that the user enter a year of construction or present the user with a map graphical user interface that allows the user to select a location on the property where any structures are located. The targeted reduction component data could in turn be utilized to determine whether the structures are likely to be elevated according to more recent construction standards or whether the structures are located on a portion of the real property that is located at a higher elevation, subject to higher or lower flood risks, or subject to a higher or lower base flood elevations, among other factors.

The Triton software engine 110 relies on the initial, supplemental, and targeted reduction component data to perform the Reduction Selection and Conversion Analyses. The Reduction Selection and Conversion Analyses are performed in real time and are configured to utilize both rule-based qualitative and quantitative modeling analytical steps. The Reduction Selection Analysis is also configurable to evaluate multiple levels of nested inquires or analytical steps that can evaluate and categorize of reductions according to a wide variety of simultaneous parameters. The results of the Reduction Selection Analysis are used to render a binary decision (i.e., a "yes" or "no") as to whether a reduction component is suitable for particular facilities as well as to quantify the probability and possible degree of reduction (i.e., how likely is the reduction to occur and how severe the potential losses could be).

The features of the Reduction Selection and Conversion Analyses of the present system and methods represent substantial improvement over traditional systems. The system enables Reduction Selection and Conversion Analyses that are performed in real time and that can consider and correlate data from a wide variety of sources. Further, the ability to perform real-time analyses utilizing complex, multimodal analytical techniques allows for efficient and accurate reduction component evaluation. The feature whereby the variation in relevant risk parameters can be considered across a reduction component, such as considering variations in ground or base flood elevation across real property, further enhances the reduction component assessment used by the present system over traditional systems.

The Triton software engine performs the Reduction Selection Analysis by first retrieving the facility identifications and the facility reduction selection rules from the data storage device. The facility reduction selection rules are implemented as facility reduction geolocation rules that set parameters surrounding the geographic locations where a facility can accept assignment of a reduction component. That is, if the reduction component location is within certain geographic locations, the facility does not accept the reduction assignment. Otherwise, the facility identification is added to a list of qualified facility identifications. More specifically, for one or more facility identifications, the Triton software engine applies the associated facility reduction geolocation rules to the reduction component geolocation coordinate data to determine one or more qualified facility identifications, and the Triton software engine stores the qualified facility identifications to the data storage device as a list of qualified facilities.

The Reduction Selection Analysis begins with a knock-out evaluation, as depicted in FIG. 2, that renders a binary decision as to whether a reduction component is suitable for assignment to particular facilities. The knock-out evaluation can incorporate rules established by both the provider and the facilities to determine whether a particular reduction component meets the underlying qualifications for a facility or facility product (i.e., a reduction dampening instrument). For each reduction being assessed, the Triton software engine 110 retrieves applicable provider, facility, or product rules from the reduction dampening instrument database 124, Product Configuration 126 database, and Facility Configuration database 130.

The knock-out evaluation can apply rules at the provider system level or facility level. For instance, with reference to evaluating a flood risk, the knock-out analysis can include a system wide rule applicable to all providers that disqualifies assignment of reduction components corresponding to real property located within a particular geographic area, such as a city or zip code identified in the mailing address provided by the user. At the facility level, some facilities can implement a rule that disqualifies assignment reduction components associated with mobile, manufactured structures while other facilities do not include such a rule. As each reduction component is evaluated, the system maintains a database list of qualified facilities. Facilities that do not meet a given rule, such as not accepting assignment of reduction components for mobile manufactured structures, are removed from the list of qualified facility database or associated with a flag or other indicator representing the facility's ability to accept assignment of a reduction component (e.g., setting a flag to "1" if the facility can accept assignment of a reduction component and a "0" if it cannot).

The knock-out evaluation may also incorporate a quantitative component or a multi-level analysis. As an example, the knock-out evaluation may disqualify a reduction component assignment corresponding to real property having geolocation data falling within a customized geographic area specified by a facility. The customized geographic area can be defined by, for example, a radial that disqualifies all reduction components located within a set distance from established coordinates. After obtaining geographic location data for the reduction component, the Triton software engine 110 determines the distance between the reduction component geolocation and the established coordinates and applies the rule obtained from the facility configuration database 130 to determine whether the reduction component falls within the disqualified radial. In this manner, the knock-out evaluation is implemented using both quantitative and qualitative analytical steps.

Those of ordinary skill in the art will appreciate that the above examples are not intended to be limiting, and the knock-out evaluation can rely on a wide variety of quantitative or qualitative rules and analytical steps. Other embodiments can disqualify reduction components based on multiple levels of parameters, such as disqualifying a reduction component represented by a dwelling located on the first floor of a multi-floor complex and that is also located within a given zip code. The knock-out evaluation can also incorporate rules that are not directed to evaluating reduction component, such as a logical check that compares a reduction component being evaluated against previously assigned reduction components stored to a Policy database 124 to ensure that a reduction is not assigned twice.

In addition to a knock-out evaluation, the Reduction Selection Analysis incorporates modeling techniques designed to calculate customizable quantitative parameters that correlate to the relative likelihood that a reduction components will result in a realized reduction as well as the degree of potential loss. Continuing with the example embodiment for assigning a flood risk, the system may use a Base Flood Elevation API to gather base flood elevation data from multiple supplemental reduction component databases 122 that may need to be normalized so that the data is comparable. In one simplified example, a first supplemental reduction component database 122 might provide 1-year and 20-year base flood elevation data while a second source provides 10-year base flood elevation data. In that case, linear extrapolation techniques can be used to calculate a 10-year base flood elevation for the first supplemental reduction component database 122 so that it is more readily compared to data from the second supplemental reduction component database 122. The Reduction Selection Analysis can use customized modeling techniques to determine an accurate base flood elevation, such as averaging all flood elevation data received from various source or relying on the one or two lowest levels.

To capture base flood elevation, the Triton software engine passes at least one of the reduction component location data or the reduction component geolocation coordinate data to a Base Flood Elevation API. The Base Flood Elevation API interfaces with a base flood elevation database by utilizing the reduction component location data or the reduction component geolocation coordinate data to obtain base flood elevation data. The Base Flood Elevation API returns the base flood elevation data to the Triton software engine. The Triton software engine determines an elevation difference value utilizing the base flood elevation data and the front door elevation value, as discussed below.

The Reduction Selection Analysis can consider additional factors specific to a given reduction component, such as the ground elevation corresponding to a known structure on the property (as opposed to an average ground elevation on the property as a whole) or a "front-door" elevation that considers the ground elevation and whether the structure is elevated on stilts or sits above a crawl space. This permits a more accurate estimate of the elevation for the reduction component structure that is compared to base flood elevation data to calculate the "elevation difference" that more accurately quantifies the reduction presented by a reduction component as compared to merely relying on base flood elevation data alone or merely relying only on whether the reduction component is located in a known flood zone or not. In other words, two properties having the same base flood elevation will not necessarily present the same probability of loss or degree of potential loss. If one property has an elevated structure and a corresponding higher elevation difference, then that property may present a lower probability of loss and a smaller degree of loss should a reduction be realized.

The system can interface with a third party database to obtain construction information utilized in the Selection and Conversion Analyses. A user is prompted by a GUI to input reduction component data into the reduction component data input element that includes a year of structure construction and structure type information. The Triton software engine passes the year of structure construction or the structure type information to a Construction Information API. The Construction Information API interfaces with a construction information database by utilizing the year of structure construction or the structure type information to obtain a structure construction height. The Construction Information API returns a structure construction height to the Triton software engine. The Triton software engine then determines a front door elevation value utilizing the reduction component elevation data and the structure construction height.

The results of the Reduction Selection Analysis can be again used to make a binary decision about whether a facility is a qualified facility, such not assigning reduction components having an Elevation Difference above or below a particular threshold. The results of the Reduction Selection Analysis can also be utilized in the Conversion Analysis, which considers both the likelihood that a reduction will be realized and the overall degree, or economic value, of a potential reduction. The result is an assessment of required premium payments for assigning a given reduction component to a particular facility.

Continuing with the above example, if the Elevation Difference or other customizable parameter indicates that the risk of reduction is lower, the premium payments can be adjusted downward accordingly as part of the Reduction Conversion Analysis. The Reduction Conversion Analysis may consider data relevant to ascertaining the value of the reduction component, which is relevant to evaluating the degree of the potential reduction. Relevant factors can include, but are not limited to, the geolocation of the reduction component real property, the year any structure on the property was built, and the type of construction, among other factors.

The Conversion Analysis can rely on statistical and other modeling techniques that characterize the probability and amount of a potential loss. The Conversion Analysis can vary according to the type of reduction being analyzed (e.g., casualty loss, automobile insurance, health insurance, etc.) and the characteristics of the reduction component. In the case of flood insurance, the Conversion Analysis can consider data relating to the reduction component such as the elevation of the reduction component property, the value of any structures on the property, a base flood plain, the cost of living in the geographic area, nearby hazards, expected environmental conditions (e.g., frequency of hurricanes or precipitation), among many other relevant factors.

The Conversion Analysis can also consider attributes and data relating to the facility to which a reduction component is assigned or market conditions, such as the capacity of a facility to satisfy liabilities from a loss (e.g., the equity or capital held by the facility), the expected incoming premiums to a facility, or current interest rates, among many other factors. Skilled artisans will appreciate that multiple techniques and factors can be utilized in the Conversion Analysis.

Reduction component assessment further considers the results of a real-time Disaggregation Analysis that evaluates facility reduction concentration. Reduction concentration examines the overall amount of potential reduction (i.e., risk of loss) of a particular type or that share particular characteristics that are currently assigned to a facility. Accepting assignment of too much potential reduction of a certain type or sharing particular characteristics can increase a facility's exposure to a catastrophic loss event. It is, therefore, advantageous for facilities to diversify reduction component holdings in part through reliance on the Disaggregation Analysis. When evaluating a reduction component, if assigning the reduction component to a given facility would cause the given facility's reduction concentration to exceed a predetermined threshold, then the facility is removed from the database of qualified facilities or otherwise associated with an indicator that the facility is not available to accept assignment of the reduction component.

Disaggregation Technology and Capacity Analysis

Figure 7:
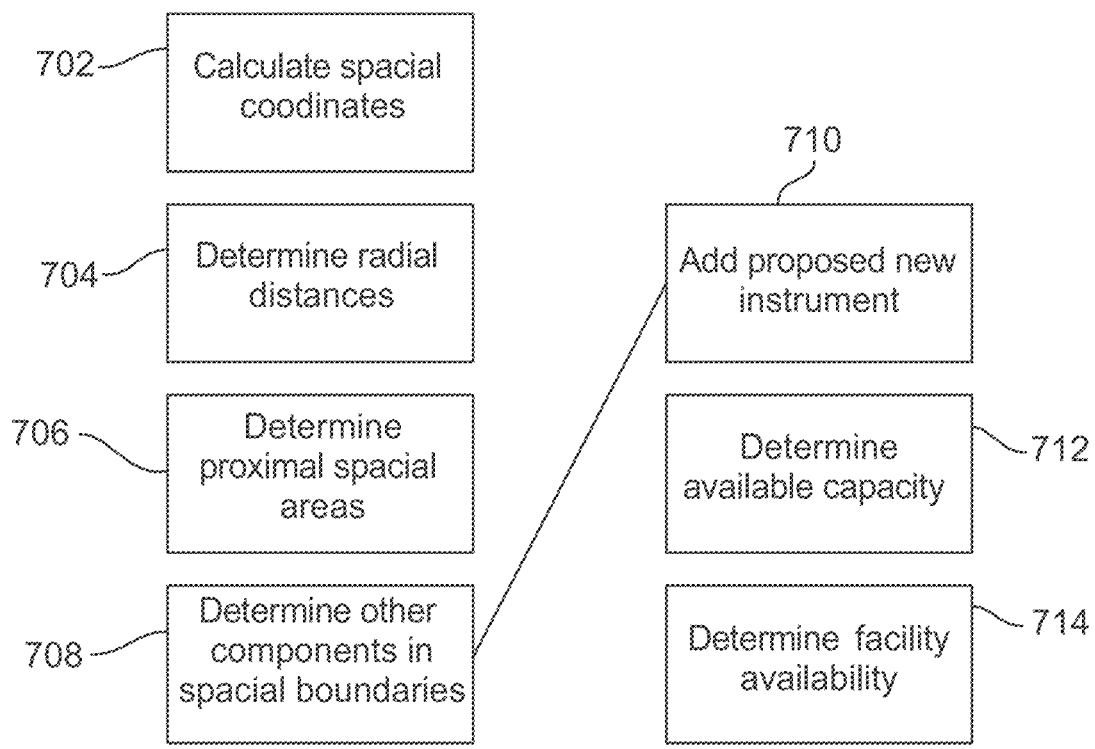
FIG. 7 illustrates an example process for Disaggregation according to one embodiment.

The Disaggregation Analysis can be performed by the Triton software engine 110 or a separate Disaggregation software application. The Disaggregation Analysis quantifies the amount of potential value reduction in the event of a loss for determining reduction concentration across a given segment. The segment can be a geographic area, a market sector, or all reduction components assigned to a facility. The amount of potential reduction (i.e., risk) can be quantified using a reduction metric, such as the total coverage amount (i.e., total reduction absorption) for all reduction dampening instruments ("TCA") and the average annual reductions ("AAR") for all potential reductions currently assigned to a facility, in a given geographic area, or in a given market. In other words, the reduction concentration is determined as the TCA or AAR for all reductions components assigned to a facility, or assigned to a facility over a given geographic area or market sector. FIG. 7 illustrates steps for determining reduction concentration and capacity.

The AAR can be determined using Monte Carlo simulation or other predictive modeling techniques to generate predictions of expected annual reductions as a result of losses. The simulations can rely on inputs that include, without limitation, deductible amounts for reduction dampening instruments that cover the reduction components, insured values or reduction absorption values of the reduction components, and elevation data. In some embodiments, AAR is divided by a total of all premium amounts paid for each reduction component within a given geographic area. Dividing the AAR by premium values is useful for evaluating the proportion of premium values that are at the risk of loss within the area.

The TCA represents the total insured value, or policy coverage amounts, for reduction components assigned to a facility or within a given geographic area or market. Each assigned reduction component is associated with a reduction dampening instrument (i.e., insurance policy) having a particular reduction absorption amount or coverage amount. The reduction absorption amount can be selected by end users at the time a reduction component is assigned or determined by individual facilities or laws or regulations. If a reduction component is assigned, the reduction absorption and the AAR are stored to the reduction dampening database 124 in a database entry associated with a unique identification for the reduction component and/or the reduction dampening instrument.

Using both the TCA and AAR reduction metrics provides a more complete assessment of potential reductions than using one reduction metric alone. One reduction metric or the other could better reflect the value of potential value reductions depending on the particular geographic area. The utility of the TCA and AAR metrics can be illustrated with the following simplified example. Assume that a first geographic area has high values for the reduction components within the area because property values and reduction dampening instrument coverage amounts are high (i.e., high insured values for insurance policies). The first geographic area is also associated with a low risk of reductions as the area is not prone to flooding. In that case, the TCA for the first geographic area would be large given the high values for reduction components and reduction dampening instrument coverage amounts, but the AAR would be low if reductions in the area are relatively infrequent.

On the other hand, a second geographic area may have low values for the reduction components within the area if real property values or reduction dampening instrument coverage amounts are low, but losses might be common if the second geographic area is prone to flooding. In that case, the calculated TCA for reduction components in the second geographic area could be low, but the AAR values could be high stemming from frequent, smaller losses. Consequently, using both the TCA and AAR metrics provides a more complete assessment of potential reductions than using one metric alone.

The TCA and AAL for each reduction component is determined at the time the new reduction component is evaluated for assignment to a facility. The TCA and AAR can also be determined at the time of the last transaction for a reduction dampening instrument or at the time of renewal. A transaction relating to the reduction dampening instrument includes, for example, when attributes of the reduction dampening instrument are changed, such as changing a coverage amount or deductible. A deductible is an amount that must be paid by an end user to a facility in the event of a reduction before the facility covers the remainder of the reduction in value. If an end user pays a larger portion of the reduction in value, the facility will pay correspondingly less (and vice versa), which impacts the average annual reduction for the facility.

With regard to renewals, reduction dampening instruments are valid only for a limited duration and must be "renewed" at periodic intervals, such as annual renewals. The attributes of a reduction dampening instrument can change at the time of a renewal as a result of a variety of factors. As just a few examples, the required premiums could be increased by a facility to account for market factors or an increase in value for the reduction component; an end user could reduce or increase the coverage amount payable in the event of a reduction in value or loss; or the facility or end user could reduce or increase the deductible. Changes to the reduction dampening instrument attributes result in a change the TCA and AAR, thereby necessitating a recalculation of the TCA or AAR at the time of a renewal.

The system performs the Collect Aggregation Data and Collect Facility Totals steps shown in FIG. 2 to gather data that is in turn used to determine the TCA and AAR for each qualified facility. The system gathers information concerning the TCA or AAR for each reduction component assigned to a facility as well as location data associated with each reduction component. The system determines the reduction concentration by totaling the TCA or AAR values for each reduction component within a specified geographic area, such as a city, county, state, or zip code. The reduction concentration calculation also includes the reduction presently being evaluated by the system. That is, the insured value or AAR for the reduction component currently being evaluated for possible assignment is added to the insured value or AAR for reductions components previously assigned and currently held for a given facility.

The reduction concentration is compared against a predetermined Available Reduction Threshold value for each facility for a given geographic area or market sector. The Available Reduction Threshold can be a TCA Threshold or an AAR Threshold. If the reduction concentration is above the Available Reduction Threshold for that geographic area or market sector, then the result of the Disaggregation Analysis can be to remove the facility from the database of qualified facilities for a particular reduction component assignment or to cache the reduction component being evaluated until additional capacity becomes available.

The Available Reduction Threshold is established as an absolute value or as a proportion of overall capacity within a facility. An Available Reduction Threshold based on absolute value is implemented as a maximum TCA or AAR that cannot be exceeded after totaling the reduction dampening instrument coverage amounts (e.g., insured values) or the average annual reductions across all reduction components in a geographic area or market sector.

Alternatively, Available Reduction Threshold can be implemented as a proportion of all reduction dampening instrument coverage amounts or annual average losses for a particular facility. To illustrate, the system can establish a TCA Threshold of 5% such that the total of all reduction dampening instrument coverage amounts for reduction components in a given geographic area cannot exceed 5% of the total coverage amounts for all reduction components within a facility across all geographic areas. In other words, not more than 5% of the facility's total coverage amounts can be located within one geographic area.

The reason for establishing Available Reduction Threshold is in part to limit the probable maximum reduction ("PMR"). The PMR is proportional to costs incurred by the facilities, which in turn relates to capacity. It is advantageous to optimize PMR to reduce costs incurred by the facilities so that facilities have increased capacity to accept assignment of additional reduction components.

The system is configurable to calculate the reduction concentration over different segments, such as geographic areas. Geographic areas can be defined with reference to political or legal boundaries that include as zip codes, cities, counties, or states. The system is also configurable to calculate the reduction concentration over a customizable geographic area, such as a specified radial, polygon, or other shape. Using segments defined by customizable geographic areas can provide a more accurate assessment of reduction concentration in circumstances where standardized geographic regions and political boundaries do not correlate to actual reduction.

As an example of reduction assessment using customizable geographic areas, assume that a given zip code is largely at high elevation and not at risk for flooding with the exception of one low elevation area surrounding a lake that is at risk for a catastrophic flood event. In that case, examining the AAR for the zip code as a whole would not provide an accurate assessment of possible reductions because the risk depends largely on whether the reduction component is proximal to the low-elevation area surrounding the lake. A reduction concentration calculation might more accurately reflect a facility's exposure to a catastrophic event by defining a radial extending a pre-defined Radial Set Point distance from the geographic Center Point of the lake or the reduction component itself and totaling the TCA and AAR data within the defined radial to determine reduction concentration.

Figure 8:
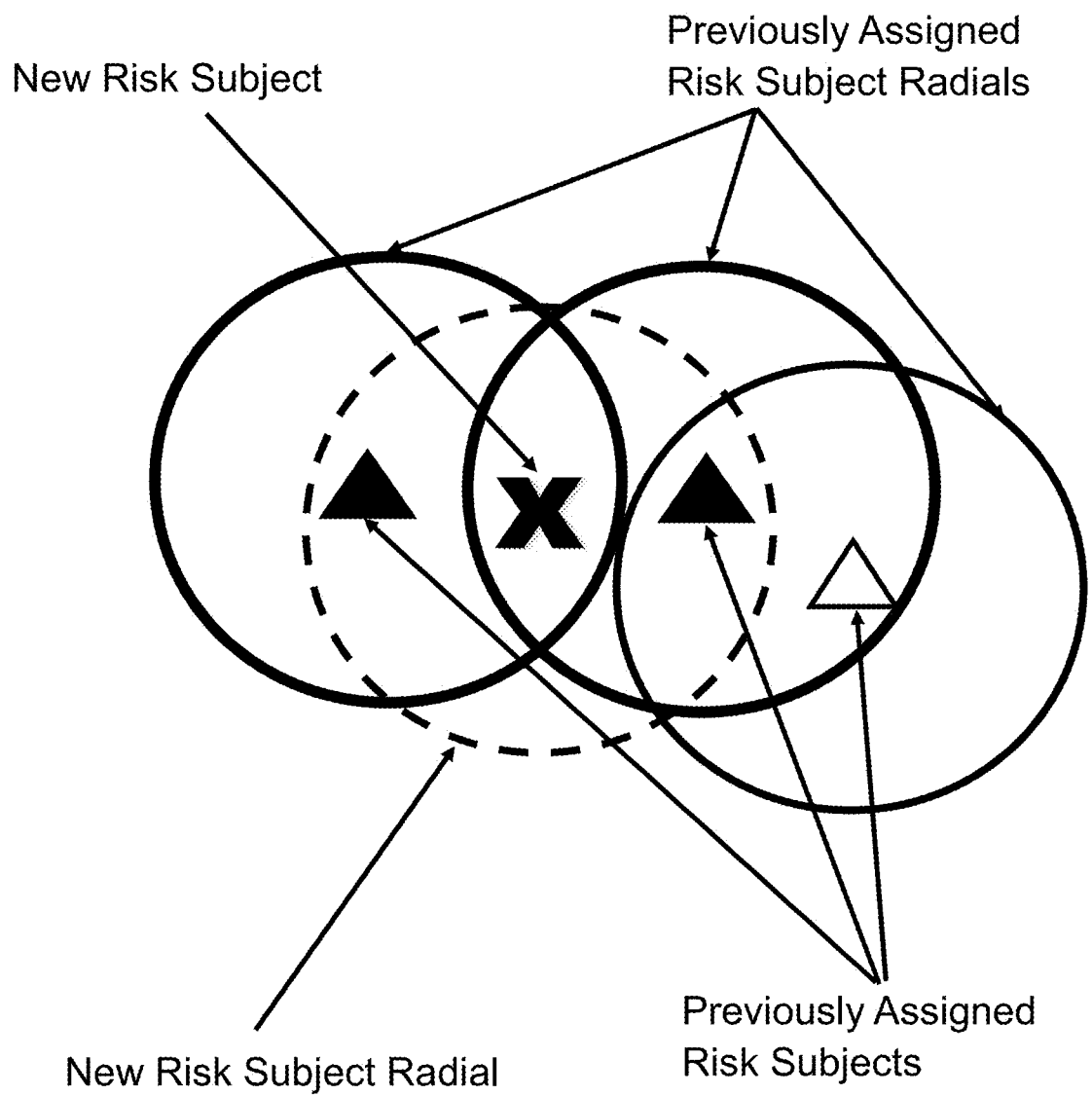
FIG. 8 illustrates interaction of radials for newly evaluated and previously assigned reduction components according to one embodiment.

Calculating radials is illustrated by FIGS. 7 and 8. For each reduction component, the system obtains geolocation data 702 and calculates the radial distances 704, 708 from each reduction component to a predetermined radial Center Point. The system identifies each reduction component that has a radial distance smaller than the Radial Set Point and totals the reduction concentration for each reduction component within the radial, including the reduction component under evaluation 710. The system compares the total reduction concentration to the Available Reduction Threshold to determine the available capacity 712 and whether a given facility should be included within the list of qualified facilities 714.

With reference to FIG. 8, the Center Point of the new reduction component under evaluation is denoted by an "X," and the new reduction component has a radial depicted as a dashed circle. The Center Points of previously assigned reduction components are designated with triangles having solid line circular radials. The system determines that two of the previously assigned reduction components, shown as solid triangles, are within the dashed-line radial for the new reduction component. One previously assigned reduction component, denoted with a triangular outline, falls outside of the new reduction component radial. The reduction concentration, such as the TCA, is the total of coverage amounts for the new reduction component and the previously assigned reduction components within the new reduction component radial (i.e., the solid triangles).

The system utilizes one or more Radial Set Points to evaluate reduction concentrations within radials for each reduction component, such as using a 5-mile TCA radial (i.e., the total coverage amounts of all reduction components in a 5-mile Radial Set Point from a reduction component Center Point), a 20-mile TCA radial, and a 5-mile AAR radial (i.e., the average annual reduction for all reduction components in a 5-mile Radial Set Point from a reduction component Center Point). Those of skill in the art will appreciate that additional Radial Set Points and metrics could also be used in determining reduction concentration.

The reduction concentration radials can be calculated for new reduction components as each new reduction component is evaluated for assignment to a facility. One drawback of this technique is that the system does not determine whether assigning a new reduction component places the radials of existing reduction components over the Available Reduction Threshold. To illustrate, consider the simplified example shown in FIG. 8 where a new reduction component designated by an "X" is being evaluated for assignment. The system determines the TCA for the new reduction component radial by totaling the reduction dampening instrument coverage amount for the new reduction component with the coverage amounts for the two previously assigned reduction components within the radial of the new reduction component.

Note that the new reduction component of FIG. 8 marked as "X" falls within the radials of the two adjacent and previously assigned reduction components shown as solid triangles. The radials for the previously assigned reduction components would include additional insured values or potential reductions if the new reduction component is accepted and assigned to a facility. Thus, assigning the new reduction component to a facility could place the reduction concentration of radials for the previously assigned reduction components above the Available Reduction Threshold. The system would not detect this threshold violation condition if the reduction concentration for radials of the previously assigned reduction components are not recalculated each time a new reduction component is assigned.

For the example shown in FIG. 8, recalculating radials for previously assigned reduction components would not present a significant burden. For real-world applications, however, there are often numerous proximal reduction components within a geographic area. On average for real-word applications, recalculating radial reduction concentrations for previously assigned reduction components requires analyzing 2,000 radials through 3 million separate software operations that must be performed in less than a second to ensure end users can effectively utilize the system. The performance demand increases for densely populated areas where reduction component density increases. These levels of performance are not possible for existing systems with the exception of Applicant's system described in the present application.

In some embodiments, the system periodically recalculates the reduction concentration of radials for all previously assigned reductions, such as recalculating the reduction concentrations for each radial once per month. The updated reduction concentrations are compared against the Available Reduction Thresholds to determine available capacity for various facilities and to detect potential threshold violations. The updated reduction concentrations are used to determine the PMR and the concomitant costs for available facilities, such as the premium costs for reinsurance policies acquired by the facilities. The costs incurred by facilities in turn factors into facility capacity determinations. The Available Reduction Thresholds are set as particular levels (e.g., 4.5%, 5%, etc.) to optimize facility costs and capacity.

The reduction concentration radial for a reduction component can optionally be recalculated at the time of renewal for a reduction dampening instrument. If the reduction concentration is above the Available Reduction Threshold, the reduction dampening instrument might not be permitted to renew, or the reduction dampening instrument could be assigned to a new facility with available capacity. In other cases, the reduction dampening instrument might be cached until such time as additional capacity is available. Additional capacity could become available if, for instance, the facility is assigned additional reduction components across all geographic areas (i.e., the size of the facility "book" is increased). Given that the Available Reduction Threshold can be a proportion of the overall reduction concentration for all reduction components assigned to a facility (e.g., 5%), then as more reduction components are assigned to a facility, the reduction concentration of a particular radial becomes a smaller proportion of the overall reduction concentration. As a result, more capacity is available for a particular radial.

As illustrated above, the reduction concentrations for radials of previously assigned reduction components will increase as new reduction components are assigned. Over time, newly assigned reduction components can cause the radial reduction concentrations for previously assigned reduction components to exceed Available Reduction Thresholds. The provider evaluating new reduction components may not know precisely when a new reduction component assignment will cause a threshold violation if reduction concentrations are recalculated at extended intervals, such as once per month.

To potentially avoid threshold violations, the provider can utilize applied Available Reduction Thresholds that are set to lower values below actual facility mandates to function as a "buffer" against threshold violations. For instance, a facility might mandate an Available Reduction Threshold of 5%. The provider may then utilize an applied Available Reduction Threshold of 4.5% to create a 0.5% buffer against threshold violations.

The end result of using a lower applied Available Reduction Threshold is that while PMR is better controlled, in some cases, not all facility capacity is utilized. A provider may decline to assign reduction components to a facility when a 4.5% applied Available Reduction Threshold is reached even if there is actual capacity available for the facility. This scenario leads to an imbalance between the demand for reduction component assignments and the supply of facility capacity.

The above drawbacks are addressed by providing near-real time calculation of reduction concentration for the radials of previously assigned reductions. Near-real time calculation allows the impact of new reduction components on existing reduction components to be evaluated before assignment of a new reduction component to a facility. This eliminates the need for a buffer between facility required Available Reduction Thresholds and applied Available Reduction Thresholds. Eliminating the buffer permits optimizing the alignment between demand for assignment of reduction components and facility capacity. Near-real time reduction concentration also facilitates caching those reduction components associated with a threshold violation because the provider has a more current view into overall facility capacity. The provider does not need to wait until the end of a month or another extended period to determine if a facility has been assigned more reduction components such that the threshold violation for a particular radial has been removed.

In one embodiment, the system recalculates the reduction concentration for all radials within the system on an hourly basis to achieve a near-real time Disaggregation Analysis. Given that calculating reduction concentrations for all radials within a system requires millions of software operations, such a performance has not been possible prior to Applicant's system. Once the radial reduction concentrations are recalculated, the updated radial concentrations are utilized when evaluating new reduction components for potential assignment.

When a new reduction component is evaluated for assignment, the system determines if the new reduction location component falls within the radial for one or more previously assigned reduction components. If so, the system adds the reduction concentration for the new reduction component to the updated reduction concentrations for previously assigned reduction components. The reduction concentrations for previously assigned reduction components (with the reduction concentration of the new reduction component) are compared against the Available Reduction Thresholds to determine if assigning the new reduction component would cause a threshold violation for previously assigned reduction components.

The present system reduces the time required to evaluate a new reduction component's impact on previously assigned reduction components from more than four hours to about 80 milliseconds. With enhanced efficiency, it is now practical to evaluate a new reduction component's impact on the reduction concentration radials previously assigned reduction components at the time a new reduction component is evaluated.

When radials are updated every hour, threshold violations for previously assigned reduction components can be detected in near-real time rather than waiting until the end of a month or another extended period. This eliminates the need for an Available Reduction Threshold buffer and allows providers to respond to real time changes in demand. For example, a provide can increase premium costs as reduction concentrations approach Available Reduction Thresholds. Realized reductions (i.e., property losses) are paid from collected premiums. Thus, collecting additional premiums allows greater mitigation against facility losses and greater control over PMR and resulting costs.

The near real-time Disaggregation Analysis utilizes a Radial Directed Acyclic Graph ("Radial DAG") to perform periodic synchronizations of a provider's reduction dampening instrument database table 124. A subset of data from the database 124 is retrieved and stored in a spatially indexed postgress intermediate database where entries are indexed according to the geolocation of the reduction component. The system, thus, creates a partial copy of the provider database 124 for the purpose of calculating radial reduction concentrations. The system utilizes data from the intermediate database to calculate the reduction concentration of all radials for all reduction components in the provider's system. The results of the radial calculations are cached to the intermediate postgress database along with facility identifications for previously assigned reduction components.

After creating the postgress intermediate database, the system selects a defined segment over which to calculation reduction concentration, such as a 5-mile or 20-mile radius. For each reduction component, the system uses spatial indexing to identify a set of proximal reduction components, as discussed below. The proximal reduction components are those that might be within the segment of the reduction component being evaluated. The geolocation data for each reduction component is used to determine whether proximal reduction components are within the segment of the of the reduction component being evaluated. For example, if the system is analyzing a 5-mile radius, the system uses the geolocation data to determine which, if any, of the proximal reduction components are within five miles of the reduction component being evaluated (i.e., the Radial Set Point). The system totals the reduction absorption values or the average annual reduction amounts for each reduction component within the five mile radius.

The Disaggregation Analysis can be run on a separate end point that supports batch processing, such as a third-party or provider-run cloud system. The end point is configurable to operate multiple microprocessors in parallel where the number of microprocessors can be increased or decreased to optimize system performance. In one embodiment, the reduction concentration calculation for all system radials is performed in about 15 to 20 minutes, and reduction concentration data is available for query from the postgress database at sub-second execution time.

The Radial DAG implements programmable system dependencies that check for the existence of certain conditions before proceeding with the next operation. For example, the Radial DAG first determines whether data has been synchronized from the reduction dampening instrument database 124 before proceeding to calculate the reduction concentration for all system radials. The Radial DAG is also programmable to perform certain operations that depend on the contingencies. For instance, if synchronization from the reduction dampening instrument database 124 takes an extended amount of time, the Radial DAG can cease the synchronization and display a "time out" notification to the provider. In yet another non-limiting example, the Radial DAG can monitor system performance over time and display a performance notification to the end user if a particular operation (e.g., a synchronization) takes an extended amount of time to complete.

The synchronization operation pulls a subset of data fields from the provider reduction dampening instruments database 124 thus synchronizing only those data fields used to calculate reduction concentration. The subset of data fields include, without limitation: (i) the inception date of reduction dampening instruments; (ii) geographic coordinates of reduction components (e.g., a property location); (iii) a facility identification; (iv) gross premium amounts; (v) flood average annual reductions; (vi) surge annual average reductions caused by surges in ocean tides; (vii) reduction dampening instruments status (i.e., whether an insurance policy is active or inactive); (viii) TCA; and (ix) reduction component assignment type (i.e., a newly assigned reduction component or a renewal).

When synchronizing data, one advantage of the present system is that the system captures data for reduction dampening instruments having a "renewal" assignment type. Renewal of reduction dampening instruments presents a challenge for calculating accurate reduction concentration because a reduction component may be included in a given radial but set to expire a short time later, thereby leading to an inflated reduction concentration calculation. The inflated reduction concentration calculation results in a threshold violation that might be cured in the near future when the reduction dampening instrument expires.

The present system is configured to mitigate against inflated reduction concentration calculations using weighted percentages. Historical data reveals that a particular proportion of reduction dampening instruments will be renewed, such 85% of policies insuring against the risk of loss from a flood event. The system utilizes data from the reduction dampening instruments database 124, such as inception date, to identify reduction dampening instrument that are within a certain time period of the renewal or expiration date, such as 75 days (or another suitable period). When calculating reduction concentration, the system can utilize a weighted percentage (i.e., 85%) of those reduction dampening instruments that are within 75 days of renewals to account for the phenomenon that not all reduction dampening instruments will be renewed. The result is a more accurate calculation of reduction concentration that leads to fewer perceived threshold violations, enhanced optimization of facility capacity, and fewer imbalances between demand for assignment of new reduction components and supply of facility capacity.

The results of the reduction concentration calculations, and data captured form the reduction dampening instruments database 124, are stored to the intermediate postgress table in a manner that is spatially indexed according to geographic location. Spatial indexing allows the system to expediently identify previously assigned reduction components that are within the radial of a potential new reduction component, and it allows the system to determine if a new reduction component is within the radial of a previously assigned reduction component.

To implement spatial indexing, the provider reduction dampening instrument 124 database and the intermediate postgress database are organized according to a series of index values that represent a two-dimensional matrix of data. This implements a hierarchical uniform decomposition of a geographic area. In one embodiment, a geographic area is decomposed into four "quad trees" where each quad tree is associated with an index value. When a new reduction component is evaluated, the system uses geolocation data for the reduction component to assign the reduction component to a quad tree. The result is that the system can quickly recognize when two reduction components are located within the same quad tree because the reduction components will have the same index value.

Each quad tree can itself be further subdivided into additional, smaller quad trees that are associated with an index value to create a second level of spatial decomposition. Additional levels of smaller quad trees can be created as needed. Those of skill in the art will appreciate that use of quad trees is not intended to be limiting, and other two dimensional subdivisions can be used, such as division into five, six, or more two dimensional components. The tress can be generally referred to as "B-trees" where "B" refers to the number of subdivision components.

The use of spatial indexing allows the system to efficiently recognize when a reduction component could be within a Radial Set Point of another reduction component by comparing index values. This eliminates the need to use geolocation data to calculate the distance between a reduction component and every other reduction component in the system, which can eliminate many millions of calculations for systems with significant numbers of reduction components. Instead, the system uses index values to quickly identify the subset of reduction components that are proximal to one another in the same or adjacent quad trees. The system then uses geolocation data to calculate distances between proximal reduction components to make a final determination if one radial component is within the Radial Set Point of another.

The Disaggregation Analysis further includes a Capacity Analysis that identifies the facilities that have sufficient capacity (i.e., the amount of reserved capital) to compensate for losses resulting from a realized reduction. Similar to reduction concentration, capacity is also evaluated according to standardized or customizable geographic areas. The Triton software engine 110 gathers facility capacity information and an Available Capacity Threshold value from the Capacity Total database 128 and performs the Evaluate Capacity step shown in FIG. 2.

The total capacity for a facility is calculated over a given geographic area or market sector and compared against the value of potential reductions over a given geographic area to determine whether the facility capacity exceeds the Available Capacity Threshold value for that area or market sector. The capacity and potential reductions are calculated considering the reduction component currently being evaluated by the system. If the capacity calculation indicates that assigning a reduction component to a given facility would result in the facility exceeding the Available Capacity Threshold, then the facility is removed from the database of qualified facilities or otherwise marked to indicate the facility is not available to accept assignment of a reduction component.

In one example embodiment, the Capacity Analysis includes the operation of, for each qualified facility identification, retrieving from a database, a reduction metric for each assigned reduction component associated with the qualified facility identification. The Triton software engine determines a total reduction concentration for each qualified facility identification based on the reduction metric for each assigned reduction component associated with the qualified facility identification. For each qualified facility identification, the total reduction metric is compared against the available capacity threshold, and the qualified facility identification is removed from the list of qualified facilities when the total reduction metric exceeds the available capacity threshold.

The reduction concentration and capacity calculations are subject to change for a given facility as new reduction components are assigned to a facility or as existing reduction components are de-assigned (i.e., a reduction dampening instrument expires). As each new reduction component is assigned to a given facility, the given facility has a higher reduction concentration and lower available capacity. Thus, reduction concentration and capacity must be continuously updated to ensure that a reduction component is not assigned to a facility that is not suitable for reduction component assignment. In traditional systems where the reduction evaluation process does not occur in real time, changes to the reduction concentration and capacity following identification of qualified facilities creates a particular problem where the evaluation process might need to be performed again. The system of the present invention avoids these pitfalls by enabling real-time evaluation of the reduction concentration. This in turn permits reduction concentration and capacity to be "reserved" by assignment of a given reduction to a facility so that the given reduction component can be accounted for in subsequent reduction evaluation processes even before a user completes the process of purchasing a reduction dampening instrument.

Following Reduction Selection, Conversion, and Disaggregation, the system performs a Facility Assignment Process, shown as the last, lower-most step in FIG. 2. The Facility Assignment Process assigns reduction to the remaining qualified facilities using a weighted, round-robin technique to help ensure balanced assignment of reduction components that does not overwhelm the reduction concentration or capacity of any one facility over a specified time period. As qualified facilities begin to approach the predetermined Available Reduction Threshold or Available Capacity Threshold, the weight for the relevant qualified facility is adjusted downward so that it is less likely to receive a reduction assignment.

Facility Assignment

With regard to the Facility Assignment Process, the even assignment of reduction components is ensured by tracking the number of reduction components assigned by the system overall and the number assigned to particular facilities. Linear weighting techniques are used to balance the reduction assignments by adjusting the statistical likelihood of a facility receiving an assignment as the facility reaches a reduction concentration threshold.

More specifically, the system implements counters, and the Facility Assignment Process includes the operation of incrementing a facility counter value each time a new reduction component is assigned to a qualified facility identification such that the facility counter value represents the number of reduction components assigned to the qualified facility identification over a given time period. The Facility Assignment Process also includes the operation of incrementing a master counter value each time any reduction component is assigned to any qualified facility identification such that the master counter value represents a total number of reduction components assigned by the system over the given time period.

To properly apportion the reduction component assignments as the facilities reach a capacity threshold, the Triton software engine determines a capacity threshold proportion for each qualified facility identification by comparing the available capacity threshold to the total assigned reduction value. The total assigned reduction value is determined by the combination of all assigned reduction values for each assigned reduction associated with the qualified facility identification. Then the Triton software engine compares the capacity threshold proportion against a weight adjustment threshold for each qualified facility identification and performs a linear weight adjustment to a facility weight when the capacity threshold proportion exceeds the weight adjustment threshold. The Triton software engine determines a target distance value by utilizing the master counter value and the facility weight and determines the assigned reduction distance value utilizing the target distance value and the facility counter value. In other words, the Triton software engine ascertains how many reduction assignments the facility should have received and compares it to the actual number of reductions assigned to the facility. The reduction components are then assigned to the facility having the lowest assigned reduction distance value.

Figure 9:
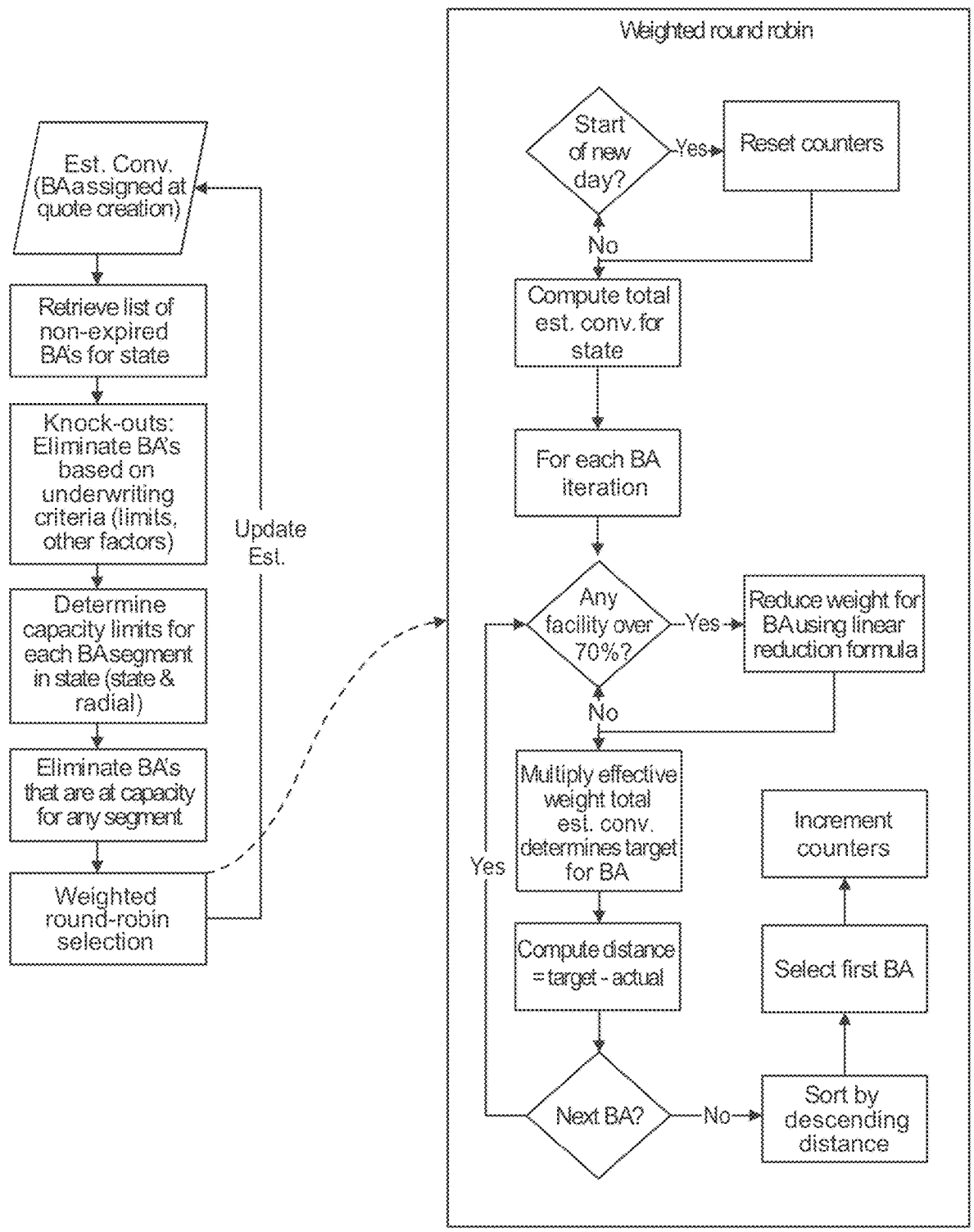
FIG. 9 illustrates an example process for Facility Assignment according to one embodiment.

Details of the Facility Assignment Process are illustrated in FIG. 9 for assignment occurring over a single day using an analysis of facility capacity. The Triton software engine 110 maintains a master counter of the total number of reduction components assigned each day, which is shown in FIG. 9 as the number of Conditional Conversion values. The Triton software engine also utilizes a facility counter to track how many reduction components are assigned to a particular facility each day (referred to as a "BA" in FIG. 9).

The master counter and facility counter are reset at the start of each day, and for purposes of the Facility Assignment Process, the reduction components, or conditional conversions, are considered assigned to a facility at the time a conditional conversion is created. As each reduction component to be assigned is evaluated at the Facility Assignment step, each qualified facility remaining after the Reduction Selection and Disaggregation Analyses, is reviewed by the Triton software engine 110 to determine whether the qualified facility is approaching a capacity threshold shown as 70% in FIG. 9. If a qualified facility has reached 70% of its Available Capacity Threshold value, the weight is adjusted downward.

Following weight adjustment, if necessary, the Triton software engine 110 uses the weights to calculate a Target number of reduction assignments for each qualified facility and a Distance from the Target using the number of Actual Assigned reduction components. That is, based on the weighed values, the system calculates a difference between the number of reduction component assignments a qualified facility should have received and the number it has actually received. Once the Distance is calculated for each qualified facility, the qualified facilities are ranked in descending order according to the Distance. So, for example, if the Counter indicates there have been 100 reduction components assigned for a day, then a first facility and a second facility, each having weights of 0.10, should have each received a Target of 10 reduction component assignments. If the first facility has received 9 Actual Assignments and the second facility has received 5, then the Distance would be 1 and 5 respectively. The facilities would be ranked in descending Distance order—5 (second facility) and 1 (first facility)—and the second facility would receive the next reduction component assignment. The Triton software engine 110 would increment the Counter and begin the process again for each new reduction to be assigned.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for electronically automating reduction component conversion and assignment comprising a computer that includes at least one processor and a memory device that stores data and executable code that, when executed, causes the at least one processor to:
   (a) capture assigned reduction component data from a reduction dampening instrument database;
   (b) populate an intermediate database table using the assigned reduction component data, wherein the intermediate database table
      (i) is spatially indexed according to hierarchical uniform two-dimensional data trees that each have an index value, and
      (ii) comprises a plurality of entries that are each associated with an assigned reduction component, an assigned reduction metric, location data, and one of the index values;
   (c) generate, for each assigned reduction component, an assigned reduction concentration according to a defined segment;
   (d) receive a first reduction component comprising location data and an first reduction component metric;
   (e) assign the first reduction component one of the index values based on the location data;
   (f) place the first reduction component within the defined segment of one of the assigned reduction components using the index values and the location data;
   (g) updated the assigned reduction concentration according to the defined segment using the first reduction component metric; and
   (h) compare the updated assigned reduction concentration for the defined segment to an Available Reduction Threshold, wherein if the updated assigned reduction concentration for the defined segment exceeds the Available Reduction Threshold, the processor (i) reassigns the assigned reduction component to a different facility, or (ii) marks the assigned reduction component for non-assignment.

2. The system for electronically automating reduction component conversion and assignment of claim 1, wherein the defined segment is a radial.

3. The system for electronically automating reduction component conversion and assignment of claim 2, wherein the defined segment is either a five-mile radial or a twenty-mile radial.

4. The system for electronically automating reduction component conversion and assignment of claim 3, wherein the reduction metric is a total coverage amount.

5. The system for electronically automating reduction component conversion and assignment of claim 3, wherein the reduction metric is an average annual reduction.

6. The system for electronically automating reduction component conversion and assignment of claim 5, wherein the average annual reduction is determined using Monte Carlo simulation techniques.

7. The system for electronically automating reduction component conversion and assignment of claim 1, wherein the executable code, when executed, further causes the at least one processor to:
   (a) define a first segment for the first reduction component;
   (b) locate proximal assigned reduction components using the index values;
   (c) place proximal assigned reduction components into the first segment using the location data;
   (d) generate a first reduction concentration using assigned reduction metric and the first reduction metric; and
   (e) compare the first reduction concentration to the Available Reduction Threshold, wherein if the first reduction concentration exceeds the Available Reduction Threshold, the processor (i) caches the first reduction component, (ii) assigns the first reduction component to a different facility, or (iii) marks the first reduction component for non-assignment.

8. The system for electronically automating reduction component conversion and assignment of claim 1, wherein the two-dimensional data trees are quad-trees.

9. The system for electronically automating reduction component conversion and assignment of claim 1, wherein at least once every hour, the processor generates, for each assigned reduction component, the assigned reduction concentration.

10. A system for electronically automating reduction component conversion and assignment comprising a computer that includes at least one processor and a memory device that stores data and executable code that, when executed, causes the at least one processor to:

(a) instruct a radial directed acyclic graph to synchronize a reduction dampening instrument database with an intermediate database, wherein
  (i) the intermediate database is spatially indexed according to hierarchical uniform two-dimensional data trees that each have an index value, and wherein
  (ii) the intermediate database comprises a plurality of entries that are each associated with an assigned reduction component, a first reduction metric, location data, and one of the index values;
(b) define a first segment for each assigned reduction component;
(c) locate, for each assigned reduction component, one or more proximal reduction components using the index values;
(d) use the location data to identify one or more proximal reduction components within the first segment;
(e) generate, for each assigned reduction component, a first reduction concentration by aggregating both (i) the first reduction metric for each proximal reduction component within the first segment and (ii) the first reduction metric for the assigned reduction component; and
(f) compare the first reduction concentration for the first segment to an Available Reduction Threshold, wherein if the first reduction concentration for the first segment exceeds the Available Reduction Threshold, the processor (i) reassigns the assigned reduction component to a different facility, or (ii) marks the assigned reduction component for non-assignment.

11. The system for electronically automating reduction component conversion and assignment of claim 10, wherein the first segment is a radial.

12. The system for electronically automating reduction component conversion and assignment of claim 10, wherein the first segment is either a five-mile radial or a twenty-mile radial.

13. The system for electronically automating reduction component conversion and assignment of claim 10, wherein the first reduction metric is a total coverage amount.

14. The system for electronically automating reduction component conversion and assignment of claim 10, wherein the first reduction metric is an average annual reduction.

15. The system for electronically automating reduction component conversion and assignment of claim 10 wherein at least once every hour, the processor generates, for each assigned reduction component, the first reduction concentration.

16. A system for electronically automating reduction component conversion and assignment comprising a computer that includes at least one processor and a memory device that stores data and executable code that, when executed, causes the at least one processor to:
  (a) synchronize a reduction dampening instrument database with an intermediate database, wherein
    (i) the intermediate database is spatially indexed according to hierarchical uniform two-dimensional data trees that each have an index value, and wherein
    (ii) the intermediate database comprises a plurality of entries that are each associated with an assigned reduction component, a first reduction metric, location data, and one of the index values;
  (b) define a first segment for each assigned reduction component;
  (c) locate, for each assigned reduction component, one or more proximal reduction components using the index values;
  (d) use the location data to identify one or more proximal reduction components within the first segment;
  (e) generate, for each assigned reduction component, a first reduction concentration by aggregating both (i) the first reduction metric for each proximal reduction component within the first segment, and (ii) the first reduction metric for the assigned reduction component;
  (f) receive a second reduction component comprising location data and a second reduction metric;
  (g) assign the second reduction component one of the index values based on the location data;
  (h) place the second reduction component within the first segment of at least one assigned reduction component using the index values and the location data;
  (i) updated the first reduction concentration using the second reduction metric; and
  (j) compare the updated first reduction concentration for the first segment to an Available Reduction Threshold, wherein if the updated first reduction concentration for the first segment exceeds the Available Reduction Threshold, the processor (i) caches the second reduction component, (ii) assigns the second reduction component to a different facility, or (iii) marks the second reduction component for non-assignment.

17. The system for electronically automating reduction component conversion and assignment of claim 16, wherein the first segment is a radial.

18. The system for electronically automating reduction component conversion and assignment of claim 17, wherein the first reduction metric and the second reduction metrics are both a total coverage amount.

19. The system for electronically automating reduction component conversion and assignment of claim 17, wherein the first reduction metric and the second reduction metrics are both an average annual reduction.

20. The system for electronically automating reduction component conversion and assignment of claim 16, wherein the executable code, when executed, further causes the at least one processor to:
  (a) define a second segment for the second reduction component;
  (b) locate proximal assigned reduction components using the index values;
  (c) place proximal assigned reduction components into the second segment using the location data;
  (d) generate a second reduction concentration using first reduction metric and the second reduction metric; and
  (e) compare the second reduction concentration to the Available Reduction Threshold, wherein if the second reduction concentration exceeds the Available Reduction Threshold, the processor (i) caches the second reduction component, (ii) assigns the second reduction component to a different facility, or (iii) marks the second reduction component for non-assignment.

* * * * *